United States Patent
Tzoganakis et al.

(10) Patent No.: US 7,247,385 B1
(45) Date of Patent: Jul. 24, 2007

(54) MELT PHASE HYDROSILYLATION OF POLYPROPYLENE

(75) Inventors: Costas Tzoganakis, Kitchener (CA); Hauke Malz, Diepholz (DE)

(73) Assignee: University of Waterloo, Waterloo, Ontario (CA)

( * ) Notice: Subject to any disclaimer, the term of this patent is extended or adjusted under 35 U.S.C. 154(b) by 0 days.

(21) Appl. No.: 09/762,765

(22) PCT Filed: Aug. 11, 1999

(86) PCT No.: PCT/CA99/00731

§ 371 (c)(1),
(2), (4) Date: May 1, 2001

(87) PCT Pub. No.: WO00/09577

PCT Pub. Date: Feb. 24, 2000

Related U.S. Application Data

(60) Provisional application No. 60/096,650, filed on Aug. 14, 1998.

(51) Int. Cl.
*B32B 27/28* (2006.01)
*C08G 81/02* (2006.01)

(52) U.S. Cl. .................. 428/447; 428/426; 525/52; 525/106; 525/333.8; 525/387; 524/506

(58) Field of Classification Search ............... 525/106, 525/333.8, 387, 910, 52; 428/447, 426; 524/506
See application file for complete search history.

(56) References Cited

U.S. PATENT DOCUMENTS

| | | | | |
|---|---|---|---|---|
| 4,831,081 A | * | 5/1989 | King, III et al. ............ | 525/106 |
| 5,641,835 A | | 6/1997 | Smith et al. | |
| 5,663,245 A | | 9/1997 | Kennedy et al. | |
| 5,741,859 A | | 4/1998 | Saxena et al. | |
| 5,756,582 A | * | 5/1998 | Mori .......................... | 525/106 |
| 6,084,030 A | * | 7/2000 | Janssen et al. .............. | 525/100 |

FOREIGN PATENT DOCUMENTS

| | | |
|---|---|---|
| DE | 3617902 A1 | 12/1987 |
| EP | 0 709 403 A1 | 5/1996 |
| EP | 0 802 216 A1 | 10/1997 |
| WO | WO 97/47665 | 12/1997 |

* cited by examiner

*Primary Examiner*—Fred Teskin
(74) *Attorney, Agent, or Firm*—Michael I. Stewart; Sim & McBurney

(57) ABSTRACT

Branched copolymers of polypropylene (PP) and polysilanes are prepared by procedures involving melt phase hydrosilylation. Such branched copolymers may be formed in situ during the melt phase hydrosilylation or may be prepared by subsequent processing. The branched copolymers exhibit superior properties.

22 Claims, 6 Drawing Sheets

MELT PHASE HYDROSILYLATION OF POLYPROPYLENE

REFERENCE TO RELATED APPLICATION

This application is a US National Phase filing pursuant to 35 USC 371 of International Patent Application No. PCT/CA99/00731 filed Aug. 11, 1999 and claims priority under 35 USC 119(e) from US Provisional Patent Application No. 60/096,650 filed Aug. 14, 1998 (now abandoned).

FIELD OF INVENTION

The present invention relates to the hydrosilylation of polypropylene and other polymers, particularly at terminal double bonds provided therein, to provide branched chain structures.

BACKGROUND TO THE INVENTION

Hydrosilylation of vinyl-terminated polypropylene (PP) has proven to be a suitable method to prepare end-functional polymers. These techniques can be used for the compatibilization of inorganic fillers or polymer blends. In WO 97/47665, assigned to University of Waterloo and the disclosure of which is incorporated herein by reference, it has been shown that the hydrosilylation of the polymer can be performed in the melt phase, that is during processing, when a platinum catalyst is activated by a peroxide. WO 97/47665 specifically describes the preparation of linear structures, i.e. the preparation of polypropylene-polydimethylsiloxane (PDMS) block copolymers. This result was achieved (WO 97/47665) by reaction of a vinyl-terminated PP with a mixture of a hydride-terminated polydimethyl-siloxane/Pt/t-butylhydro-peroxide solution in a batch mixer or single-screw extruder at processing temperatures of about 170° to about 220° C. Thus, melt phase hydrosilylation makes it possible to produce PP-PDMS block copolymers. This product is of considerable interest since it is known that polydimethylsiloxanes have a low glass transition temperature and a high gas permeability. By in-situ synthesis of block copolymers, reactive blending of both polymers becomes possible and thus interesting blend properties can be achieved.

However, to prepare the vinyl-termination on the chain-end necessary for the preparation of the block copolymers, the polypropylene was degraded by peroxides prior to the hydrosilylation reaction. The degradation has led to a decrease in the molar mass as well as in the polydispersity. These effects reduced the mechanical properties of the material, such as the elongation at break and the tensile impact strength. Hence, the application of the products produced according to the procedures of WO 97/47665, was restricted.

SUMMARY OF INVENTION

It has now been found that the detrimental effects of the terminal degradation, namely decrease of molar mass and polydispersity, can be reversed by reacting, in the melt phase, vinyl-terminated polypropylene with, for example, a methyl hydrosiloxane-dimethylsiloxane random copolymer (MDMS). In general, a polysilane having at least two Si—H groups and sufficient to permit the generation of a three-dimensional or branched structure is employed.

In accordance with one aspect of the present invention, there is provided a branched copolymer of polypropylene (PP) or other polymer and a silicone polymer. Such copolymers may be formed by melt phase hydrosilylation of terminally-unsaturated polypropylene or other polymer containing unsaturation.

The silicone polymer may be various linear, branched and cyclic polysilanes as discussed in detail below. The copolymers provided herein may be useful for fibre spinning, thermoforming, blow molding and/or thermoforming applications.

In one specific embodiment of the invention, the silicone polymer is a methylhydrosiloxane-dimethylsiloxane (MDMS) random block copolymer. The PP and MDMS may be reacted in such a ratio as to leave free Si—H groups in the polymer. Such free Si—H groups may be used to couple the copolymer to a variety of other materials, including inorganic fillers, inorganic surfaces, hydroxy-containing polymers, vinyl-containing polymers or other polymers containing functional groups reactive with free Si—H groups.

The coupling between the copolymer having free Si—H groups and the other materials may be effected in any convenient manner, generally by a hydrosilylation reaction or a dehydrogenerative coupling reaction, depending on the nature of the coupling.

Alternatively, in a copolymer with free Si—H groups, such Si—H groups may be cross-linked. Such cross-linking may be effected by converting Si—H groups to Si—OH groups by a metal catalyzed reaction with water and subsequently dehydrogeneratively coupling to other free Si—H groups. Alternatively, the free Si—H groups may be reacted with dehydrogenerative coupling.

The PP-MDMS copolymer also may be coupled to metallic, glass, ceramic or other vitreous surfaces.

Polypropylene and silicone polymers are normally incompatible to blend together. The present invention enables stable blends to be provided. Accordingly, in a further aspect of the invention, there is provided a blend of incompatible blend partners which are polypropylene (PP) and a silicone polymer, which may be rendered compatible by forming a branched copolymer, preferably by a hydrosilylation reaction. Alternatively, the incompatible blend partners are connected by Si—O—Si bridges.

The silicone polymer preferably is a methyl-hydrosiloxane-dimethylsiloxane random copolymer (MDMS), which is incorporated into a branched PP-MDMS block copolymer by melt phase hydrosilylation. The PP-MDMS block copolymer may contain free Si—H groups.

The present invention further extends to a method of forming a branched polypropylene or other polymer, which comprises effecting melt phase hydrosilylation of terminally-unsaturated polypropylene or other polymer containing unsaturation in the presence of methylhydrosiloxane-dimethylsiloxane random copolymer (MDMS).

In addition, the present invention provides, in a further aspect, a process of forming a branched polypropylene or other polymer, which comprises:

effecting hydrosilylation of a vinyl end group of polypropylene or other unsaturated polymer and a trialkoxysilane to form a functionalized polymer, and thereafter effecting post-reaction branching of the functionalized polymer by reacting Si—OR groups to form a Si—O—Si bridge.

GENERAL DESCRIPTION OF INVENTION

Figure 1:
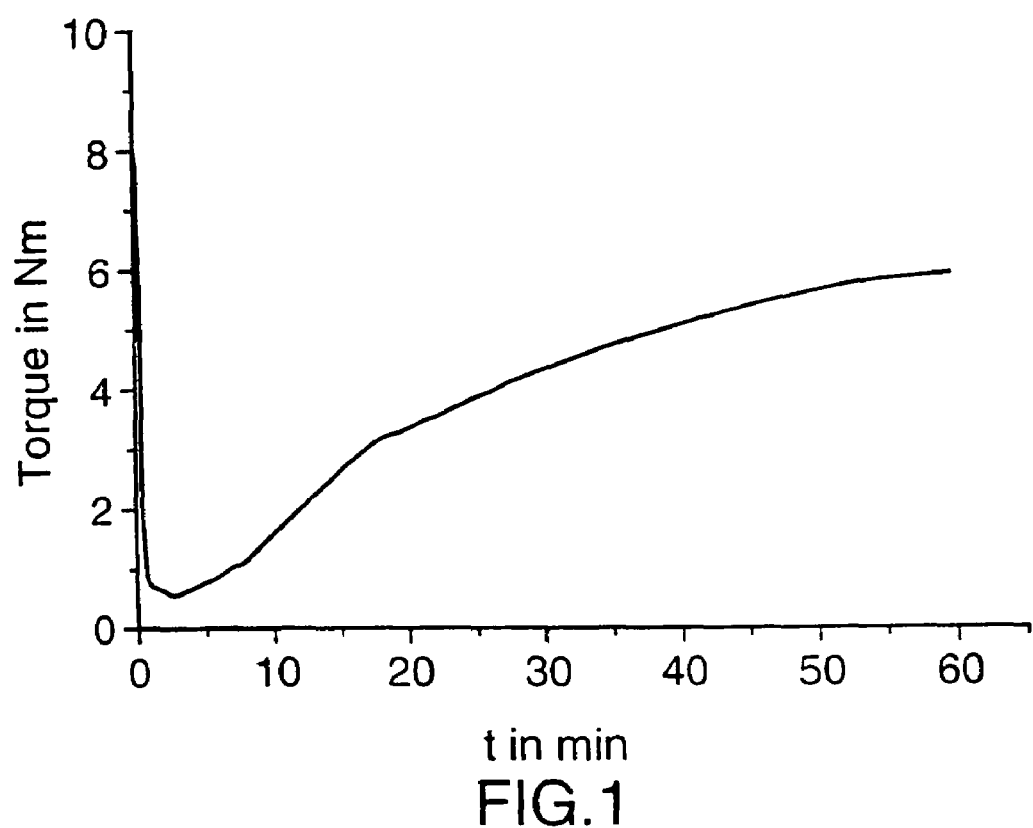
FIG. 1 contains a graphical representation of the relationship of torque to kneading time in an experiment described herein.

As set forth above, the present invention is concerned with a melt phase hydrosilylation of polypropylene with polysilane having at least two Si—H groups and sufficient to permit the generation of a three-dimensional or branched structure.

Although the invention is described herein with reference to polypropylene, the hydrosilylation process is applicable to all types of polyolefins or indeed any other polymer which is inert to the conditions of the hydrosilylation reaction and in which double bonds are present.

One class of polysilane which may be employed herein has the Formula I:

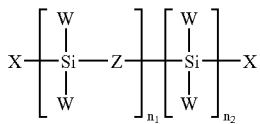
-I

An example of a polysilane according to Formula I is the polyhydrosiloxane having the formula:

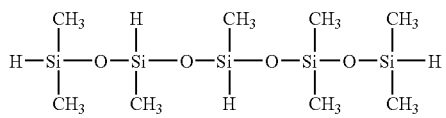

Another class of polysilane which may be employed herein has the Formula II:

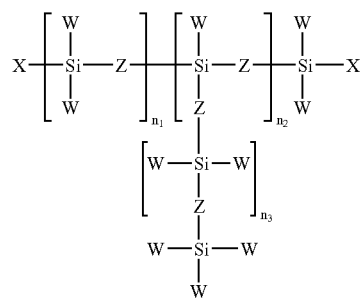
-II

An example of a polysilane according to Formula II is the branched polyhydrosiloxane having the formula:

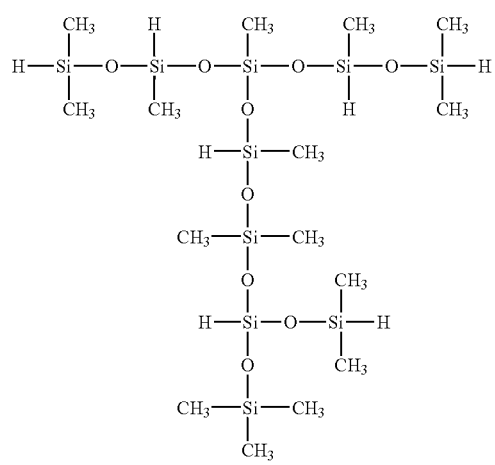

A further class of polysilane which may be employed herein has the Formula III:

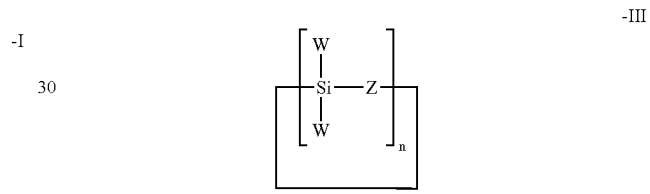
-III

An example of a polysilane according to Formula III is the cyclic polyhydrosiloxane having the formula:

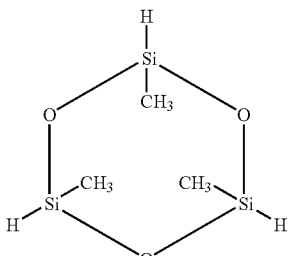

In the above Formulae I, II and III, the symbols mean as follows:

X is any organic end group and preferably is —$CH_3$ or —H;

W is any organic or inorganic group. Typical examples for W are H, $CH_3$ alkyl, phenyl, amines, nitriles, halides, silicones, siloxanes.

X and W are selected to ensure that the molecule contains at least two Si—H groups and sufficient to provide a branched structure.

n, $n_1$ or $n_2$ is the number of repeating groups in the chain. In addition, branched polypropylene can also be produced by the use of any branched silane or siloxane or any other two or three dimensional silane or siloxane structure, such as rings or cubes, for example, a three-dimensional silsesquioxane.

The present invention is concerned with the functionalization of terminal double bonds in polypropylene and other polymers to yield a branched block copolymer structure. The terminal double bonds in polypropylene are created by peroxide degradation. The use of any other polypropylene with terminal vinylidene radicals (i.e., Metallocene PP, amorphous PP) is possible. The functionalization is performed by peroxide-initiated or platinum-catalyzed hydrosilylation. In the case of the platinum-catalyzed hydrosilylation reaction, t-butylhydroperoxide may be added as a cocatalyst. The reactions are performed in the melt phase of the polypropylene in typical processing equipment, i.e., an extruder, a batch mixer or other convenient equipment, such as a hot press. The reaction conditions are such that conversion of the reactants is high during the processing. Once the product leaves the equipment, no further treatment, such as curing or purifying is necessary. Degradation of the polypropylene to provide terminal unsaturation and hydrosilylation with the appropriately hydrided polysilane can be performed simultaneously or sequentially without intermittent solidification, as well as sequentially with intermittent solidification, as desired.

We have shown by experimentation that the formation of MDMS-PP branch copolymers leads to an increase in molar mass as well as polydispersity. In one typical experiment, 3 g of toluene were added to 1.5 g MDMS with a molar mass of 2000 and an Si—H content of about 25 to 30 mol % SiH. After addition of 45 µL of platinum catalyst (Karstedt's catalyst—platinum (O)-divinyl-tetramethyldisiloxane) and 90 µL of cumene hydroperoxide, the solution was masterbatched with 35 g of degraded Polypropylene (PP-deg). Subsequently the mixture was kneaded in a Brabender mixer for 60 min. at 180° C. In that time the torque of the kneader increased significantly (FIG. 1). The product of the reaction was investigated by high temperature (HT) gas phase chromatography (GPC). The result obtained is shown in Table 1 below. Clearly, an increase in molar mass and polydispersity compared to the degraded PP can be seen. The sample was soluble in toluene which indicates that a branched structure was produced rather than a cross linked structure. When interpreting the GPC data, it has to be considered that this technique underestimates the molar mass of branched structures. This is caused by the smaller hydrodynamic volume of these branched molecules.

Figure 2:
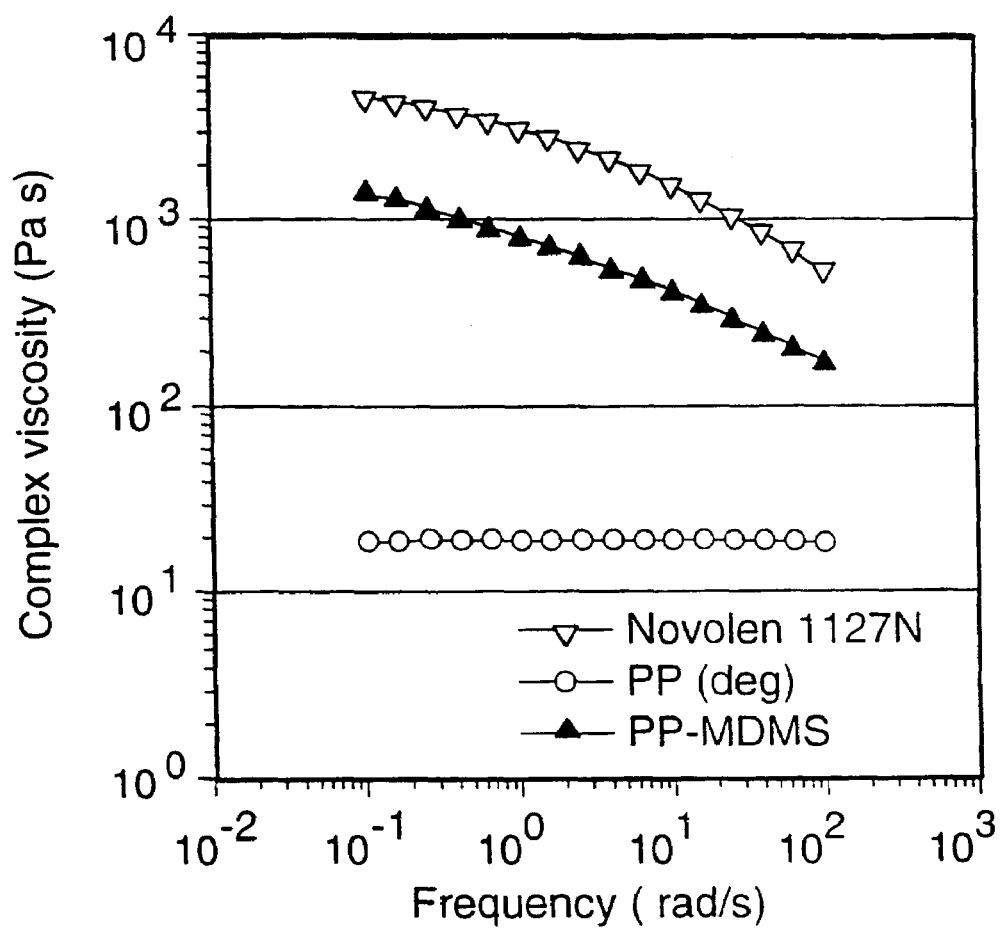
FIGS. 2 and 3 contain the graphical representations of the results of oscillatory shear experiments carried out on polymers produced herein.
Figure 3:
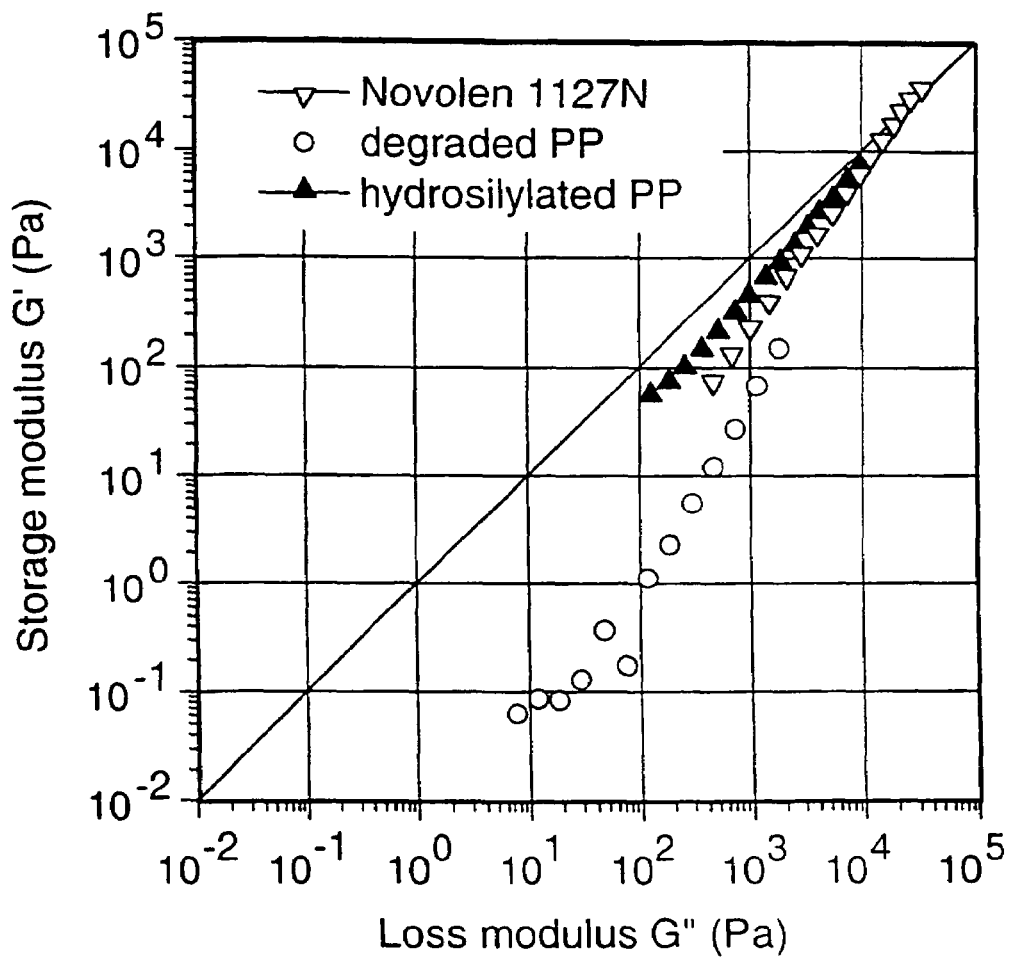

A sample of the product was investigated in oscillatory shear experiments. The results are summarized in FIG. 2 and FIG. 3. The complex viscosity of the PP-MDMS material is dramatically increased compared to the degraded PP (FIG. 2). In addition, the PP-MDMS material appears to be more elastic than both the virgin PP (Novolen) and the degraded PP (its storage modulus is higher than that of the other two materials, as seen in FIG. 3). The improved elasticity of the material makes it a very good candidate for fibre spinning, thermoforming, blow molding, and foaming applications.

The PP-MDMS polymer produced in this experiment could not be dissolved by THF from the sample blends, suggesting that the PP-MDMS was acting as a compatibilizer. The PP-MDMS could only be removed by depolymerization. To investigate this issue, a microtomed surface was treated with 20% KOH for 5 h at 60° C. to depolymerize the siloxane. Afterwards, the samples were investigated by scanning electron microscopy and small holes (1 µm or less in diameter) were observed, proving the removal of the MDMS phase.

Figure 4A:
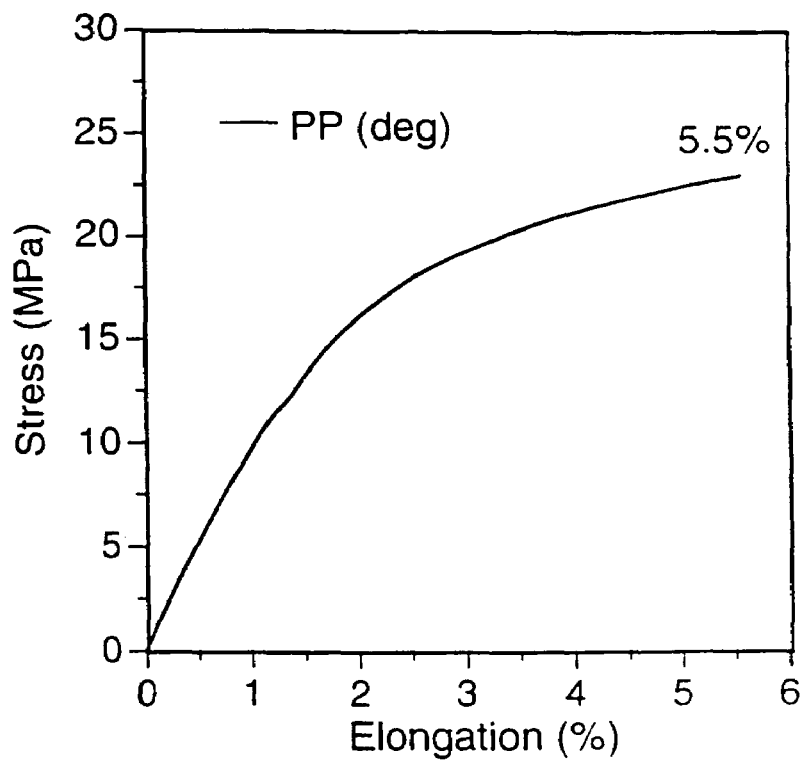
FIGS. 4 to 6 contain graphical representations of the results of mechanical testing of the polymers produced herein.
Figure 4B:
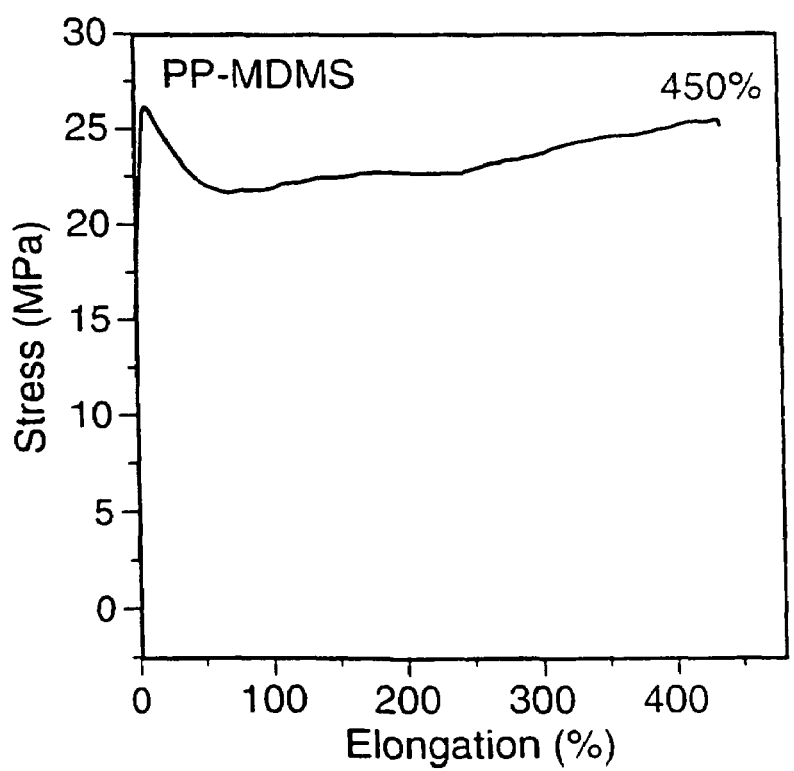
Figure 5:
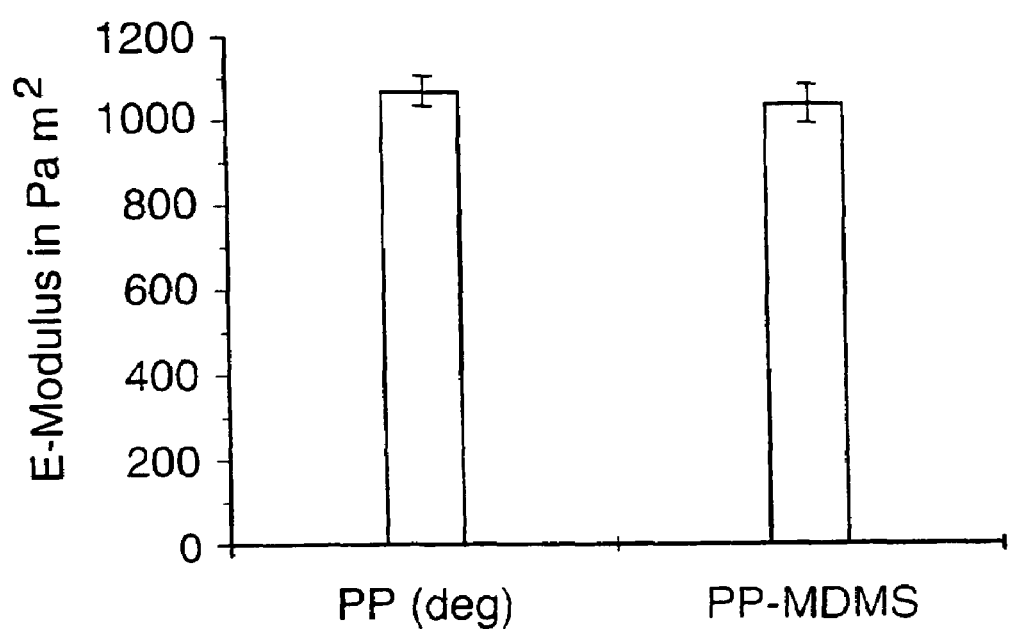
Figure 6:
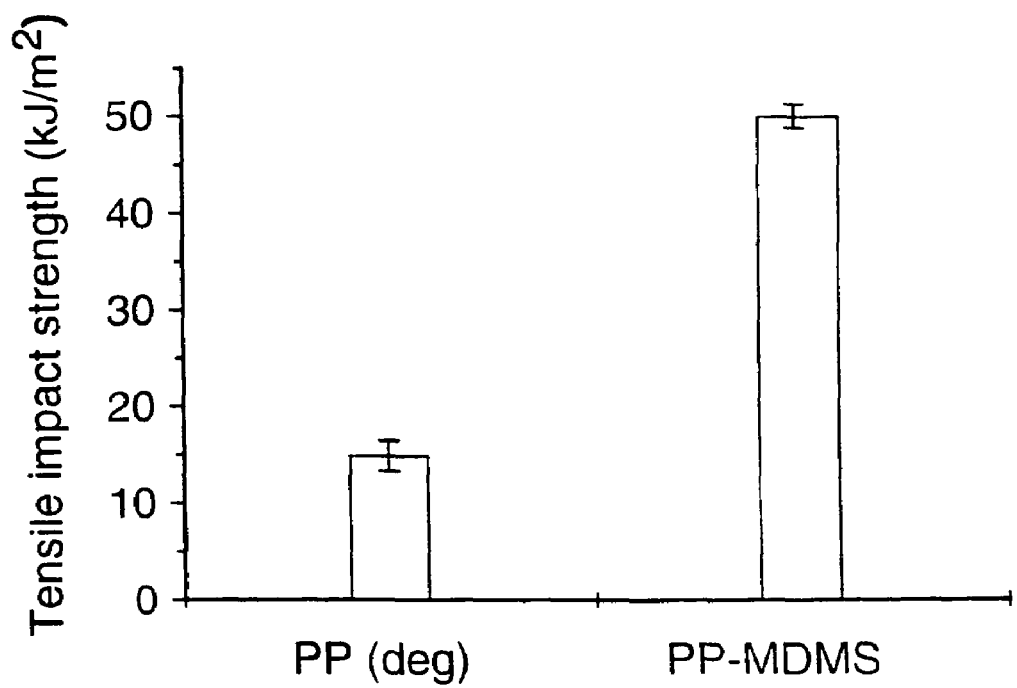

In another experiment, 9 wt % of MDMS were reacted with the degraded PP. Samples of the blends were injection moulded into a dog-bone shaped specimen (S2 Din 53 504) and submitted to mechanical testing. As it can be seen in FIG. 4 to FIG. 6, all mechanical characteristics of the hydrosilylated product increased significantly. Although the MDMS is a liquid with a low viscosity it did not show the effect of a plasticizer. This can be seen in FIG. 5.

These experiments show that the formation of branched PP-MDMS block copolymers with good mechanical properties is possible following the procedure of the invention. If Si—H groups are used in excess of those required to provide the branched structure, then this gives the opportunity for further reactions. For example, the Si—H group may be readily transformed into another functional group, such as an Si—OH by reaction with water. Reaction of such Si—OH groups with alcohols by dehydrogenative coupling leads to the formation of silylethers. If the hydroxy groups on the silylethers were coupled to another polymer, this would mean another compatibilization reaction. If the hydroxygroups on the silylether are part of the surface of an inorganic filler, the coupling of the PP to the filler may be enhanced.

Functionalization of vinyl-terminated PP with a silane bearing hydrolysable groups leads to a second but indirect pathway to producing a branched polypropylene. Examples of silane for use in producing such a PP are trimethoxysilane, triethoxysilane and trichlorosilane. In this procedure, a PP is hydrosilylated in the melt phase with the triethoxysilane, for example. The resulting alkoxyether may be hydrolysed by boiling the sample in a waterbath. Addition of a metal catalyst, such as dibutyl tin laurate, activates the hydrolysis. At the same time, the catalyst catalyses the condensation of two Si—OH groups produced by the hydrolysis reaction to form an Si—O—Si bridge, leading to a branching of PP chains. A sample of such a reaction pathway was investigated by HT-GPC. The results are summarized in Table 1. Again an increase in $M_w$ and $M_z$ can be seen.

TABLE 1

| Materials | Mn (g/mol) | Mw (g/mol) | Mz (g/mol) |
|---|---|---|---|
| Degraded PP | 31000 | 72000 | 135000 |
| PP-MDMS | 47000 | 210000 | 720000 |
| PP-Triethoxysilane | 30000 | 88000 | 450000 |

EXAMPLES

Example 1

This Example describes the formation of the reactive MDMS/Pt solution used to hydrosilylate polypropylene.

9 g of toluene were added to 6 g of a MDMS (HMS 301—Gelest. Corp. molecular mass 2000. 40 µL platinum catalyst and 200 µL cumene hydroperoxide next were added under vigorous stirring of the solution. After the gas formation stopped, the solution was blanketed with argon and stored in the refrigerator.

Example 2

This Example describes the degradation of the polypropylene which is used for the melt phase hydrosilylation.

3 kg PP (Novolen 1127 N-BASF, Mwt. were masterbatched with 0.5 wt % of DHBP (dihydro-butylperoxide—Peroxide Chemie) in a 5 L powder bottle. The masterbatch was loaded into a hopper and fed to a twin screw extruder (ZSK 30. Werner and Pfleiderer). The reaction temperature was 220° C. The extruder screw speed was 200 RPM and the product was extruded through a 4 mm die and was pelletized after cooling in a water bath.

Example 3

This Example describes the formation of branched PP-MDMS copolymers in a Brabender-Mixer.

35 g granules of PP (deg) were mixed with 5 g of powdered PP (deg). 4 g of the solution described in sample 1 were added to the PP (deg). The masterbatch was fed to a brabender mixer at 180° C. and kneaded with 80 RPM. The torque of the brabender was followed on-line.

After 60 min. the reaction was stopped and the product was recovered.

Example 4

This example describes the formation of a branched PP-MDMS copolymer in a reactive extrusion step.

PP (deg) from Example 2 was added to a Haake Rheomex 252 single screw extruder until steady state was reached. Then 100 g of a masterbatch of PP (deg) and 3 wt % of MDMS/toluene/Pt/cumene hydroperoxide solution from Example 1 were added to the feeder.

The reaction was observed until steady state was reached. Then, it was allowed to proceed for another 10 min.

Example 5

This Example describes the formation of a glass fibre reinforced PP-MDMS-blend in a Brabender mixer.

35 g granules of PP (deg) were mixed with 5 g of powdered PP (deg). 8 g of the solution described in sample 1 were added to the PP (deg). The masterbatch was loaded to a Brabender mixer at 180° C. and kneaded at 80 RPM. The torque of the brabender was followed on-line.

After 60 min, 10 g of glass fibres were added to the system. The mixture was kneaded until the product was homogeneous and then stopped. The product was recovered.

Example 6

This Example describes the synthesis of a triethoxysilane-Pt solution used to hydrosilylate PP.

100 μL Pt-catalyst and 200 μL cumene hydroperoxide were added to 10 g triethoxysilane. The mixture was stirred until the gas development stopped. The solution was blanketed with argon and stored at 5° C.

Example 7

This Example describes the formation of a branched PP polymer.

3 g of powdered PP (deg) of Example 2 were masterbatched with 0.3 ml of a solution prepared as described in Example 6. The masterbatch was added to a minimixer. The reaction was allowed to proceed at 170° C. for 30 min.

The recovered product was boiled in a solution consisting of 59 isopropanol, 89 g water and 1 g dibutyl tin laurate to lead to a branching of the PP.

SUMMARY OF THE DISCLOSURE

In summary of this disclosure, the present invention provides procedures for obtaining branched polypropylene-polysilane copolymers by the use of specific polysilanes in melt phase hydrosilylation reactions. Modifications are possible within the scope of the invention.

The invention claimed is:

1. A branched copolymer of polypropylene (PP) and methylhydrosiloxane-dimethylsiloxane random copolymer (MDMS) produced by melt phase hydrosilylation, wherein the ratio of PP to MDMS is such that the polymer contains free Si—H groups, said copolymer being coupled, through free Si—H groups, to an inorganic filler, inorganic surface, a hydroxy-containing polymer, vinyl-containing polymer or other polymer containing functional groups reactive with free Si—H.

2. The copolymer of claim 1 wherein said coupling is effected by a hydrosilylation reaction or a dehydrogenerative coupling reaction.

3. A branched copolymer of polypropylene (PP) and a methylhydrosiloxane-dimethylsiloxane random copolymer (MDMS) produced by melt phase hydrosilylation, which is coupled to metallic, glass, ceramic or other vitreous surface.

4. A branched copolymer of polypropylene (PP) and methylhydrosiloxane-dimethylsiloxane random copolymer (MDMS) produced by melt phase hydrosilylation, wherein the ratio of PP to MDMS is such that the polymer contains free Si—H groups and wherein the free Si—H groups are cross-linked.

5. The copolymer of claim 4 wherein free Si—H groups are converted into a Si—OH group by a metal-catalyzed reaction with water and subsequently dehydrogenatively coupling to a second Si—H group.

6. The copolymer of claim 4 wherein Si—H groups are reacted by dehydrogenative coupling.

7. A process of forming a branched polypropylene, which comprises effecting melt phase hydrosilylation of a terminally-unsaturated polypropylene in the presence of a methylhydrosiloxane-dimethylsiloxane random copolymer (MDMS).

8. The process of claim 7 wherein the ratio of polypropylene to methylhydrosiloxane-dimethylsiloxane random copolymer is such that the polymer contains free Si—H groups.

9. The process of claim 8 wherein said copolymer is coupled, through free Si—H groups, to an inorganic filter, inorganic surface, a hydroxyl-containing polymer, vinyl-containing polymer or other polymer containing functional groups reactive with free Si—H.

10. The process of claim 9 wherein said coupling is effected by a hydrosilylation reaction or a dehydrogenerative coupling reaction.

11. The process of claim 7 wherein the free Si—H groups are cross-linked.

12. The process of claim 11 wherein free Si—H groups are converted into a Si—OH group by a metal-catalyzed reaction with water and subsequently dehydrogenatively coupling to a second Si—H group.

13. The process of claim 11 wherein Si—H groups are reacted by dehydrogenative coupling.

14. The process of claim 7 wherein said copolymer is coupled to metallic, glass, ceramic or other vitreous surface.

15. A process of forming a branched copolymer, which comprises:
   treating a polyolefin with peroxide to provide terminal unsaturation, and
   reacting the terminally-unsaturated polyolefin with a silicone polymer containing at least two Si—H groups in a melt phase reactive extrusion hydrosilylation reaction.

16. The process of claim 15 wherein said silicone polymer is a polysilane of the Formula I:

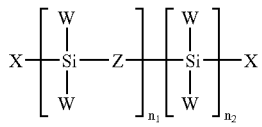
-I wherein X is an organic end group, W is an organic or inorganic group, with X and W being selected such that the polysilane contains at least two Si—H groups and sufficient to provide a branched structure, Z is oxygen, and $n_1$ and $n_2$ are the number of repeating groups in the chain.

17. The process of claim 16 wherein said polysilane of formula I is a polyhydrosiloxane of the formula:

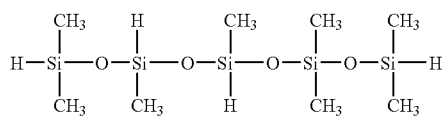

18. The process of claim 15 wherein said silicone polymer is a polysilane of the Formula II:

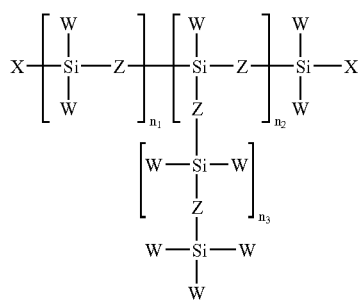
-II wherein X is an organic end group, W is an organic or inorganic group, with X and W being selected such that the polysilane contains at least two Si—H groups and sufficient to provide a branched structure, Z is oxygen, and $n_1$, $n_2$ and $n_3$ are the number of repeating groups in the chain.

19. The process of claim 18 wherein said polysilane of Formula II is a branched polyhydrosiloxane of the formula:

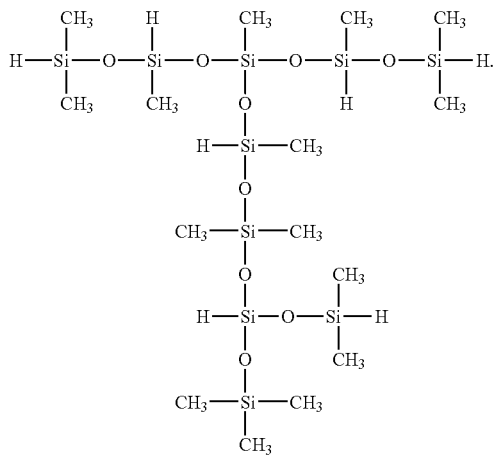

20. The process of claim 15 wherein said silicone polymer is a polysilane of the formula III:

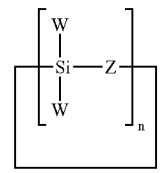
-III wherein W is an organic or inorganic group selected such that the polysilane contains at least two Si—H groups and sufficient to provide a branched structure, Z is oxygen, and n is the number of repeating groups in the chain.

21. The process of claim 20 wherein said polysilane is a cyclic polyhydrosiloxane of the formula:

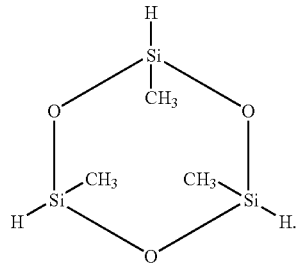

22. The process of claim 15 wherein said polyolefin is polypropylene.

* * * * *